(12) United States Patent
Matsumoto et al.

(10) Patent No.: US 11,974,954 B2
(45) Date of Patent: May 7, 2024

(54) ELECTRIC POWER ASSIST DEVICE AND PROGRAM

(71) Applicant: TOYOTA JIDOSHA KABUSHIKI KAISHA, Toyota (JP)

(72) Inventors: Yuma Matsumoto, Susono (JP); Hirotaka Saito, Sunto-gun (JP); Yuka Shiraiwa, Fuji (JP); Takahiro Uchida, Susono (JP); Shuji Moriyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 423 days.

(21) Appl. No.: 17/526,085

(22) Filed: Nov. 15, 2021

(65) Prior Publication Data

US 2022/0175596 A1 Jun. 9, 2022

(30) Foreign Application Priority Data

Dec. 4, 2020 (JP) ................................ 2020-202249

(51) Int. Cl.
*A61G 5/04* (2013.01)
*H02P 23/00* (2016.01)

(52) U.S. Cl.
CPC ............ *A61G 5/04* (2013.01); *H02P 23/0077* (2013.01)

(58) Field of Classification Search
CPC ........ A61G 5/04; A61G 5/10; A61G 2203/40; A61G 2203/46; H02P 23/0077
See application file for complete search history.

(56) References Cited

U.S. PATENT DOCUMENTS

| | | | | |
|---|---|---|---|---|
| 6,059,060 A | * | 5/2000 | Kanno | A61G 5/045 180/907 |
| 6,230,831 B1 | * | 5/2001 | Ogata | A61G 5/048 318/60 |
| 6,408,961 B1 | * | 6/2002 | Chen | A61G 5/045 180/65.6 |
| 6,459,962 B2 | * | 10/2002 | Ulrich | B62D 51/04 701/1 |
| 9,144,525 B2 | * | 9/2015 | Richter | A61G 5/1005 |
| 9,398,990 B2 | * | 7/2016 | Richter | A61G 5/04 |
| 9,795,524 B2 | * | 10/2017 | Richter | A61G 5/047 |
| 2002/0066616 A1 | * | 6/2002 | Wessman | B60T 8/1755 180/443 |
| 2019/0278080 A1 | * | 9/2019 | Ishibashi | G08G 1/166 |

FOREIGN PATENT DOCUMENTS

JP      3557006 B2     8/2004

* cited by examiner

*Primary Examiner* — Frederick M Brushaber
(74) *Attorney, Agent, or Firm* — Oliff PLC

(57) ABSTRACT

An electric power assist device includes a processor including hardware. The processor assists human power input from a user to a drive member with power of a motor, determines whether a current position is located outdoors using a signal from a sensor, and when determination is made that the current position is located outdoors, reduces an assist amount by the motor as compared with a case where the current position is located indoors.

20 Claims, 3 Drawing Sheets

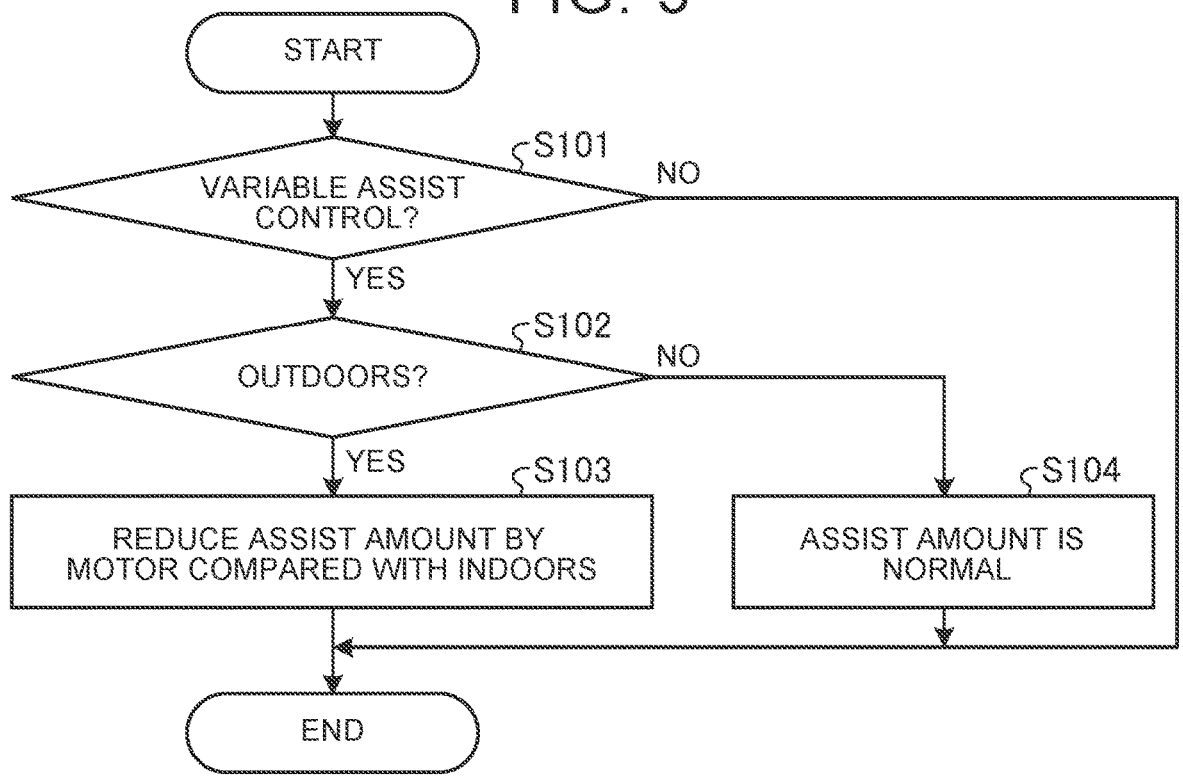
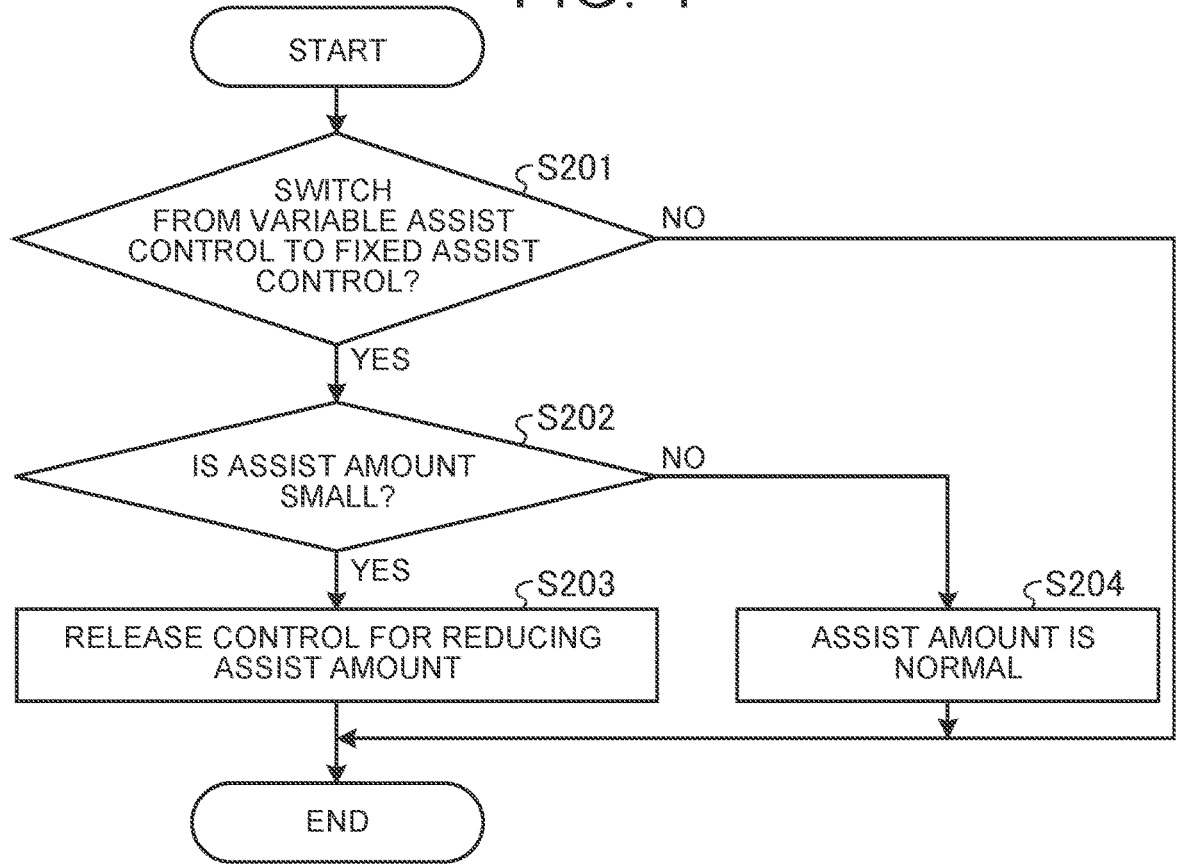

ELECTRIC POWER ASSIST DEVICE AND PROGRAM

CROSS-REFERENCE TO RELATED APPLICATION

This application claims priority to Japanese Patent Application No. 2020-202249 filed on Dec. 4, 2020, incorporated herein by reference in its entirety.

BACKGROUND

1. Technical Field

The present disclosure relates to electric power assist devices and programs.

2. Description of Related Art

Japanese Patent No. 3557006 (JP 3557006 B) discloses that a wheelchair in which wheels are driven by human power is provided with an electric power assist device that drives the wheels in an auxiliary manner by a motor.

SUMMARY

In a wheelchair in which wheels are driven by a motor in an auxiliary manner using electric power of a battery as in a configuration described in JP 3557006 B, there is a risk that the electric power of the battery will be used up under an environment where a few recharging facilities are located, when going out.

The present disclosure has been made in view of the above circumstances, and an object of the present disclosure is to provide an electric power assist device and a program capable of suppressing the electric power to be used up when going out.

An electric power assist device according to the present disclosure includes a processor including hardware. The processor assists human power input from a user to a drive member with power of a motor, determines whether a current position is located outdoors using a signal from a sensor, and when determination is made that the current position is located outdoors, reduces an assist amount by the motor as compared with a case where the current position is located indoors.

A program according to the present disclosure causes a processor including hardware to execute assisting human power input from a user to a drive member with power of a motor, determining whether a current position is located outdoors using a signal from a sensor, and when determination is made that the current position is located outdoors, reducing an assist amount by the motor as compared with a case where the current position is located indoors.

According to the present disclosure, it is possible to suppress the electric power supplied to the electric power assist device from being used up when going out.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing a processing flow of variable assist control;

FIG. 4 is a flowchart showing a processing flow when switching to fixed assist control;

DETAILED DESCRIPTION OF EMBODIMENTS

Hereinafter, an electric power assist device and a program according to an embodiment of the present disclosure will be specifically described with reference to the drawings. Further, the present disclosure is not limited to the embodiment described below.

Figure 1:
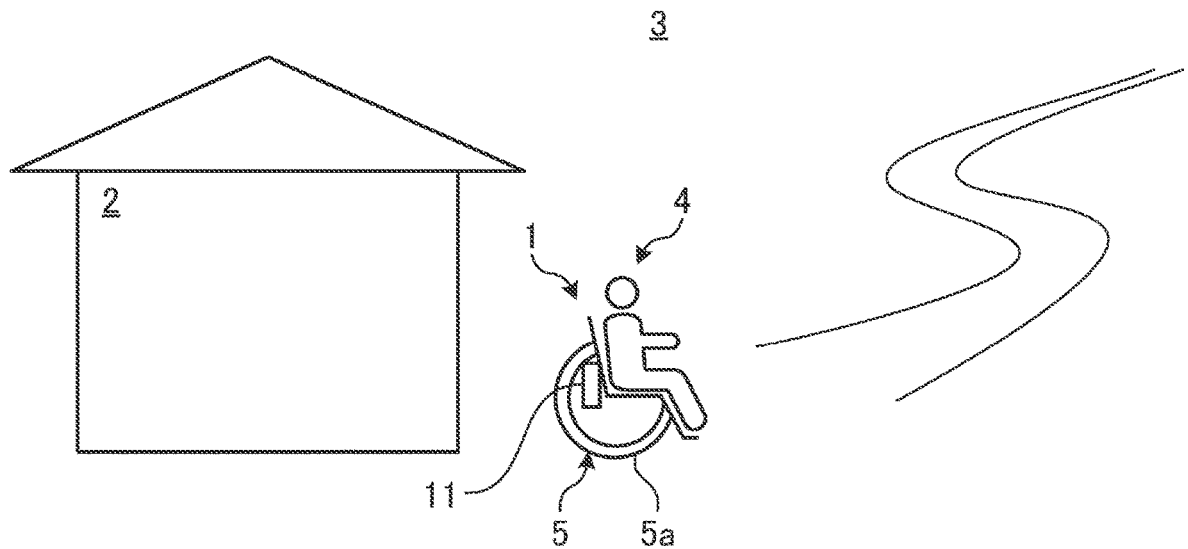
FIG. 1 is a schematic view showing a schematic configuration of an electric power assist device according to an embodiment.

FIG. 1 is a schematic view showing a schematic configuration of an electric power assist device according to an embodiment. As shown in FIG. 1, an electric power assist device 1 is a device for assisting a user 4 to move independently when the user 4 moves indoors 2 or outdoors 3. In the present embodiment, a wheelchair 5 used by the user 4 is provided with the electric power assist device 1. That is, the wheelchair 5 provided with the electric power assist device 1 is configured as a moving body that allows the user 4 to move independently. In this description, the wheelchair 5 provided with the electric power assist device 1 may be referred to as an electric power assist wheelchair.

The wheelchair 5 includes a hand rim to which human power by the user 4 is input, and a wheel 5a that rotates together with the hand rim. When the user 4 inputs human power to the hand rim, the human power is transmitted to the wheel 5a. In this case, the hand rim and the wheel 5a rotate together. That is, the wheel 5a is a drive member to which human power from the user 4 is input.

The electric power assist device 1 drives the wheels 5a in an auxiliary manner by driving a motor 12 (shown in FIG. 2) using electric power of a battery 11 for the wheelchair 5 in which the user 4 manually drives the wheels 5a. The torque output from the motor 12 assists the driving force of the wheels 5a. As described above, the wheel 5a is a rotating member to be assisted by the electric power assist device 1. For example, as shown in FIG. 1, when the user 4 goes outdoors 3 using the wheelchair 5 provided with the electric power assist device 1, the wheelchair 5 is configured to acquire auxiliary power by the motor 12 using the electric power charged in the battery 11 in advance. The battery 11 is charged with the electric power supplied from an external power source. The external power source includes outlets installed indoors 2 such as houses and commercial facilities.

Figure 2:
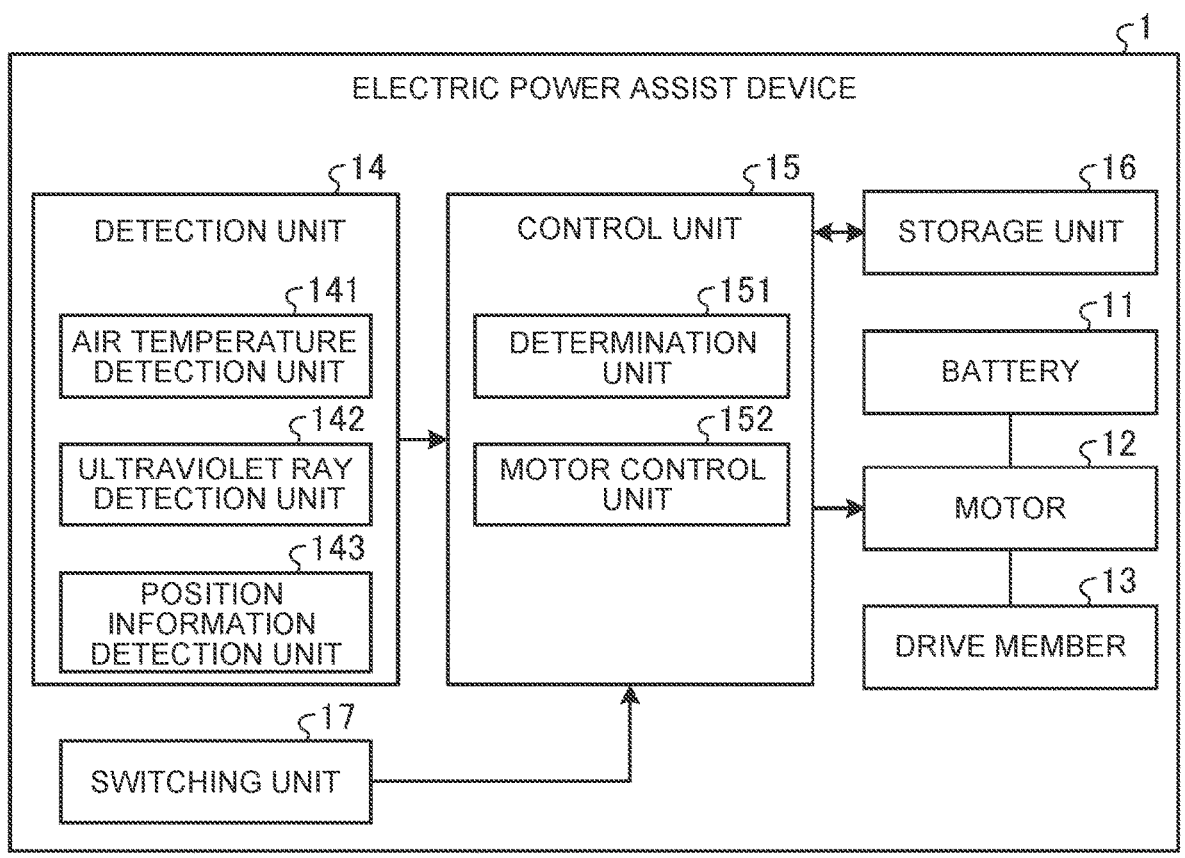
FIG. 2 is a block diagram showing functional blocks of the electric power assist device.

FIG. 2 is a block diagram showing functional blocks of the electric power assist device. The functional blocks shown in FIG. 2 can be regarded as functional blocks of the electric power assist wheelchair.

As shown in FIG. 2, the electric power assist device 1 includes a battery 11, a motor 12, a drive member 13, a detection unit 14, a control unit 15, a storage unit 16, and a switching unit 17.

The battery 11 is a storage battery that stores electric power to be supplied to the motor 12. The battery 11 is composed of a secondary battery such as a lithium ion battery. For example, the battery 11 is connected to the outlet provided indoors 2 via a charger. Thus, the electric power supplied from the external power source is charged in the battery 11. Further, the battery 11 is electrically connected to the motor 12. Therefore, the electric power charged in the battery 11 can be supplied to the motor 12.

The motor 12 is an electric motor that is driven using the electric power stored in the battery 11. The power output from the motor 12 is transmitted to the drive member 13. In the electric power assist wheelchair, the motor 12 and the wheels 5a are arranged on the same rotation center axis. The rotor of the motor 12 and the drive member 13 are configured to rotate together.

For example, one motor 12 is provided on each of the right and left wheels 5a. That is, the motors 12 includes a right-side motor (first motor) for driving the right wheel 5a in an auxiliary manner and a left-side motor (second motor) for driving the left wheel 5a in an auxiliary manner. In this case, the number of rotations of the right and left wheels 5a can be controlled to be different between the right-side motor and the left-side motor. Thereby, it is possible to assist the wheelchair 5 to change directions or turn.

The drive member 13 is composed of the wheels 5a. In addition to the human power input from the user 4, auxiliary power from the motor 12 is input to the drive member 13. For example, the drive member 13 is a rotating member arranged on the same axis as the rotation center of the motor 12. The drive member 13 can be driven only by the human power input from the user 4 without the auxiliary power from the motor 12. That is, the wheelchair 5 can be driven by the human power without consuming the electric power of the battery 11. That is, the wheelchair 5 can be driven by the human power even if the electric power of the battery 11 is used up.

The detection unit 14 is a sensor that detects information indicating an external environment of the wheelchair 5. The information detected by the detection unit 14 is output to the control unit 15. The detection unit 14 includes an air temperature detection unit 141, an ultraviolet ray detection unit 142, and a position information detection unit 143.

The air temperature detection unit 141 is a sensor that detects an ambient temperature. In the case of indoors 2, a room temperature is detected by the air temperature detection unit 141. In the case of outdoors 3, an air temperature is detected by the air temperature detection unit 141.

The ultraviolet ray detection unit 142 is a sensor that detects ultraviolet rays. In both indoors 2 and outdoors 3, the ultraviolet ray detection unit 142 measures ultraviolet rays emitted to the wheelchair 5.

The position information detection unit 143 is a sensor that detects a current position of the wheelchair 5. For example, the position information detection unit 143 is composed of a positioning device that uses a global positioning system (GPS).

The control unit 15 includes a processor and a memory. The processor includes a central processing unit (CPU), a digital signal processor (DSP), a field-programmable gate array (FPGA), and the like. The memory is a main storage device, and includes a random access memory (RAM), a read-only memory (ROM), and the like. The control unit 15 loads the program stored in the storage unit 16 into the work area of the memory (main storage device) and executes the program, and controls each component, etc. through the execution of the program such that the function that satisfies a predetermined purpose can be realized.

The storage unit 16 is composed of a recording medium such as erasable programmable ROM (EPROM). The storage unit 16 stores various programs executed by the control unit 15.

For example, the storage unit 16 stores a program for executing the electric power assist control for driving the drive member 13 in an auxiliary manner. That is, when the human power from the user 4 is input to the drive member 13, the control unit 15 executes the electric power assist control for driving the drive member 13 by the motor 12 in an auxiliary manner. When the control unit 15 executes the electric power assist control, a motor control unit 152 controls the torque and the number of rotations of the motor 12. In the electric power assist wheelchair, the electric power assist control is executed such that large driving force can be acquired with small human power in the drive member 13.

Further, the control unit 15 executes various controls based on an input signal from the detection unit 14. For example, when the control unit 15 executes the electric power assist control, a determination unit 151 determines whether the wheelchair 5 is located outdoors 3 using the signal from the detection unit 14. Then, the control unit 15 executes different electric power assist controls depending on whether determination is made that the wheelchair 5 is located outdoors 3 or the wheelchair 5 is located indoors 2. Different electric power assist controls include fixed assist control in which an assist amount by the motor 12 is fixed to a predetermined value, and variable assist control in which an assist amount by the motor 12 is automatically changed. This predetermined value is a preset value and is stored in the storage unit 16. In this description, the variable assist control may be described as first control, and the fixed assist control may be described as second control.

The switching unit 17 is composed of a manual switch for switching the electric power assist control. The switching unit 17 is an operation unit operated by the user 4. For example, the switching unit 17 is composed of a switch for switching ON and OFF of the electric power assist and a switch for switching between the variable assist control and the fixed assist control.

For example, when the electric power assist is selected to ON by the switching unit 17 and the fixed assist control is selected, the control unit 15 executes the fixed assist control among the electric power assist controls. For example, when the electric power assist is selected to ON by the switching unit 17 and the variable assist control is selected, the control unit 15 executes the variable assist control among the electric power assist controls. That is, the control unit 15 switches between the variable assist control and the fixed assist control based on the signal from the switching unit 17. Further, when the electric power assist is selected to OFF by the switching unit 17, the control unit 15 does not execute the electric power assist control. As described above, in the electric power assist device 1, it is possible to select the presence and absence of the electric power assist and the type of the electric power assist control based on the selection of the user 4.

FIG. 3 is a flowchart showing a processing flow of the variable assist control. The process shown in FIG. 3 is performed by the control unit 15.

The control unit 15 determines whether the variable assist control is being executed (step S101). In step S101, it is determined whether the variable assist control that is the first control is being executed among the electric power assist controls using the power of the motor 12.

When it is determined that the variable assist control is not being executed (step S101: No), this control routine ends.

When it is determined that the variable assist control is being executed (step S101: Yes), the control unit 15 determines whether the current position of the wheelchair 5 is outdoors 3 using the signal from the detection unit 14 (step S102). In step S102, the determination unit 151 determines whether the current position is the outdoors 3.

For example, in step S102, the determination unit 151 determines whether the current position is the outdoors 3 based on the air temperature detected by the air temperature detection unit 141. Alternatively, the determination unit 151 determines whether the current position is the outdoors 3 based on the ultraviolet rays detected by the ultraviolet ray detection unit 142. Alternatively, the determination unit 151 determines whether the current position is the outdoors 3 based on the current position information detected by the position information detection unit 143.

When it is determined that the current position of the wheelchair 5 is the outdoors 3 (step S102: Yes), the control unit 15 reduces the assist amount by the motor 12 as compared with a case where the wheelchair 5 is located indoors 2 (step S103). In step S103, the motor control unit 152 controls the torque and the number of rotations of the motor 12, and executes control such that the assist amount by the motor 12 is reduced. In step S103, when the assist amount by the motor 12 is reduced, the motor control unit 152 limits at least one of the maximum speed of the motor 12, the maximum torque of the motor 12, and the maximum acceleration of the motor 12. Information indicating the maximum speed, maximum torque, and maximum acceleration is stored in advance in the storage unit 16. That is, the control unit 15 reduces the output of the motor 12 using the limit value stored in the storage unit 16 and reduces the assist amount by the motor 12. When the process of step S103 is executed, this control routine ends.

When it is determined that the current position of the wheelchair 5 is not the outdoors 3 (step S102: No), the control unit 15 controls the assist amount by the motor 12 to a normal level (step S104). In step S104, the assist amount of the motor 12 is controlled to be normal by the motor control unit 152. In step S104, the control unit 15 maintains the assist amount by the motor 12 such that the assist amount is not changed from the normal level. When the process of step S104 is executed, this control routine ends.

FIG. 4 is a flowchart showing a processing flow when switching to the fixed assist control. The process shown in FIG. 4 is performed by the control unit 15.

The control unit 15 determines whether the variable assist control has been switched to the fixed assist control (step S201). In step S201, the determination unit 151 determines whether to switch to the fixed assist control. For example, when the switching unit 17 is operated by the user 4 and the operation is a switching operation from the variable assist control to the fixed assist control, the determination unit 151 makes a determination based on the signal input from the switching unit 17 to the control unit 15.

When it is determined that the variable assist control has not been switched to the fixed assist control (step S201: No), this control routine ends.

When it is determined that the variable assist control has been switched to the fixed assist control (step S201: Yes), the control unit 15 determines whether the control for reducing the assist amount by the motor 12 is being executed (step S202). In step S202, it is determined whether the request for switching to the fixed assist control is accepted in response to the operation of the switching unit 17 during the execution of the control for reducing the assist amount by the motor 12 because the wheelchair 5 is located outdoors 3.

When it is determined that the control for reducing the assist amount by the motor 12 is being executed (step S202: Yes), the control unit 15 releases the control for reducing the assist amount by the motor 12 (step S203). In step S203, the motor control unit 152 releases the control for reducing the assist amount by the motor 12. In this case, the motor control unit 152 releases the control for reducing the assist amount, but the electric power assist control itself continues. That is, in step S203, the assist amount is changed such that the assist amount by the motor 12 becomes large. When the process of step S203 is executed, this control routine ends.

When it is determined that the control for reducing the assist amount by the motor 12 is not being executed (step S203: No), the control unit 15 controls the assist amount by the motor 12 to the normal level (step S204). In step S204, the assist amount by the motor 12 is controlled to be normal by the motor control unit 152. In this case, since the assist amount is controlled to the same level as a case in which the wheelchair 5 is located indoors 2 at the stage of the variable assist control before switching to the fixed assist control, the assist amount does not change when shifting from the variable assist control to the fixed assist control. When the process of step S204 is executed, this control routine ends.

Note that the processing order of step S201 and step S202 is not limited to the example shown in FIG. 4. Further, step S201 and step S202 may be combined into one determination step.

Figure 5:
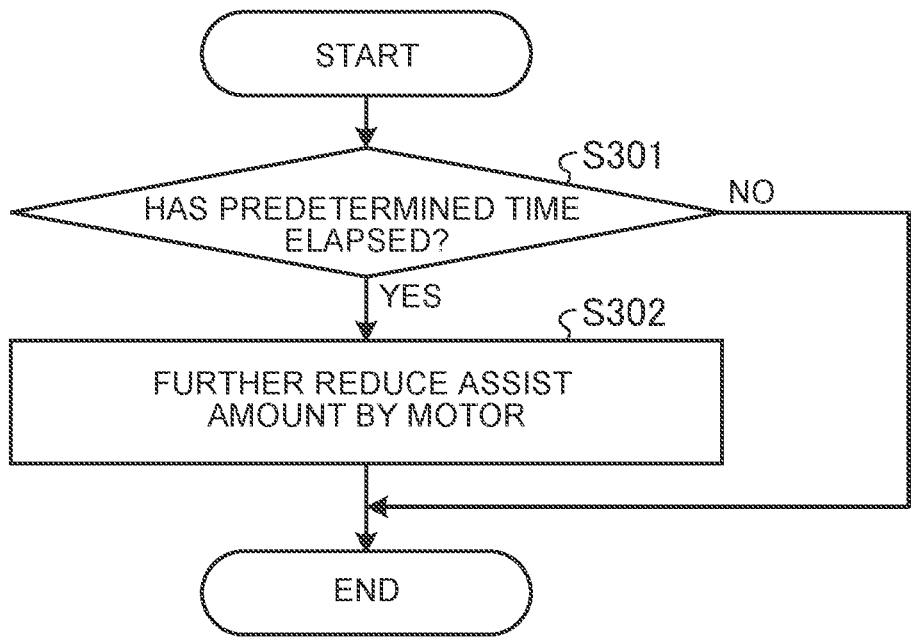
FIG. 5 is a flowchart showing a processing flow executed during variable assist control.

FIG. 5 is a flowchart showing a processing flow executed during the variable assist control. The process shown in FIG. 5 is performed by the control unit 15.

The control unit 15 determines whether a predetermined time has elapsed since the start of the variable assist control (step S301). The control unit 15 includes a timer unit that measures the elapsed time from the start of control. In step S301, the determination unit 151 determines whether the elapsed time from the start of control exceeds a predetermined time. This predetermined time is a value set in advance based on the relationship between the amount of electric power consumed by the battery 11 and the time, and the like. Information on the predetermined time is stored in the storage unit 16.

When it is determined that the predetermined time has not elapsed since the start of the variable assist control (step S301: No), this control routine ends.

When it is determined that the predetermined time has elapsed since the start of the variable assist control (step S301: Yes), the control unit 15 further reduces the assist amount by the motor 12 (step S302). In step S302, the assist amount is controlled to be further reduced while the motor control unit 152 is already executing the control for reducing the assist amount. That is, in step S302, the assist amount by the motor 12 is further reduced by one level. When the process of step S302 is executed, this control routine ends.

By performing the process of step S302, the amount of electric power consumed by the battery 11 when driving the motor 12 can be further reduced. As a result, the time during which the driving force assisted by the motor 12 can be received becomes longer.

Figure 6:
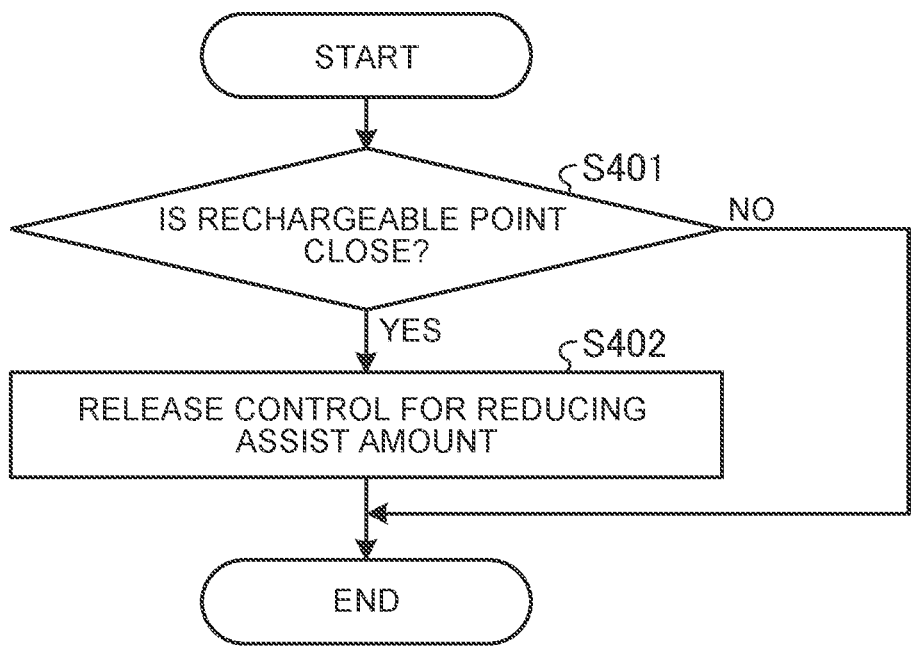
FIG. 6 is a flowchart showing another processing flow executed during variable assist control.

FIG. 6 is a flowchart showing another processing flow executed during the variable assist control. The process shown in FIG. 6 is performed by the control unit 15.

The control unit 15 determines whether the current position is close to a rechargeable point (step S401). In step S401, it is determined whether the current position is close to the rechargeable point using information indicating the current position of the wheelchair 5 detected by the position information detection unit 143 and information on the rechargeable point indicating a recharging location where an external power source is installed. The control unit 15 can acquire the information on the rechargeable point using map information stored in the storage unit 16. Then, when the moving distance between the current position and the rechargeable point is shorter than a predetermined distance, the determination unit 151 determines that the current position is close to the rechargeable point. This predetermined distance is stored in advance in the storage unit 16. Further, the moving distance may be a straight line distance connecting the current position and the rechargeable point, or may be a length of a road leading from the current position to the rechargeable point. Information on these moving distances can be acquired based on the map information stored in the storage unit 16.

When it is not determined that the current position is close to the rechargeable point (step S401: No), this control routine ends.

When it is determined that the current position is close to the rechargeable point (step S401: Yes), the control unit 15 releases the control for reducing the assist amount by the motor 12 (step S402). In step S402, although the control for reducing the assist amount is released, the variable assist control is continued as the electric power assist control. That is, even when the assist amount is controlled to be normal in the variable assist control, it is possible to reach the rechargeable point before the electric power of the battery 11 is used up. When the process of step S402 is executed, this control routine ends.

As described above, according to the embodiment, it is possible to suppress the electric power assist device 1 from using up the electric power of the battery 11 when going out.

Note that the electric power assist device 1 is not limited to a structure in which the motor 12 and the drive member 13 are arranged on the same rotation center axis. For example, the motor 12 and the drive member 13 may be connected so as to be able to transmit power via a speed reducer. Further, the motor 12 and the drive member 13 may be arranged on different rotation center axes.

Further, the electric power assist device 1 is not limited to a case where the electric power assist device 1 is provided on the wheelchair 5. For example, the electric power assist device 1 for a walking assist device that assists the walking of the user 4 may be used. This walking assist device uses auxiliary power generated by the power of the motor 12. Examples of the walking assist device include a wheelbarrow and a device that assists the user 4 in swinging the legs and bending and stretching the joints.

Further, the process shown in FIG. 3 may be repeatedly executed during the variable assist control. In this case, the process of step S101 is omitted, and the control routine starts from step S102.

Further, the control unit 15 controls the assist amount by the motor 12 to a normal level even when the current position is the outdoors 3 during the execution of the fixed assist control that is the second control among the electric power assist controls. That is, during the execution of the fixed assist control, even when the wheelchair 5 is moved from the indoors 2 to the outdoors 3, the assist amount by the motor 12 is not reduced. For example, even when the determination unit 151 determines that the current position is the outdoors 3, the assist amount remains unchanged at a predetermined value during the execution of the fixed assist control. Therefore, the determination unit 151 does not have to perform the determination process of whether the current position is the outdoors 3 while the control unit 15 is executing the fixed assist control.

Further, in the fixed assist control, a predetermined value may be set in a plurality of stages. That is, it may be possible to fix the assist amount to any one of a large assist amount, a medium assist amount, and a small assist amount.

Further, in step S301 shown in FIG. 5, it may be determined whether the time during which the wheelchair 5 stays outdoors 3 exceeds the predetermined time. In this case, the control unit 15 measures the time during which the wheelchair 5 stays outdoors 3 from the timing when it is determined that the current position is the outdoors 3. The determination process of step S301 may be performed using this staying time.

Further, in step S401 shown in FIG. 6, determination may be made based on the relationship between the state of charge (SOC) of the battery 11 and the moving distance. In this case, the control unit 15 calculates the distance for which the wheelchair 5 can move by the remaining electric power based on the SOC of the battery 11. Then, when the rechargeable point is located within the range of the movable distance from the current position, it is determined that the current position is close to the rechargeable point.

Further effects and modifications can be easily derived by those skilled in the art. The broader aspects of the present disclosure are not limited to the particular details and representative embodiments shown and described above. Accordingly, various modifications may be made without departing from the spirit or scope of the general inventive concept as defined by the appended claims and their equivalents.

What is claimed is:

1. An electric power assist device comprising a processor including hardware, wherein the processor:
   assists human power input from a user to a drive member with power of a motor;
   determines whether a current position is located outdoors using a signal from a sensor; and
   when determination is made that the current position is located outdoors, reduces an assist amount by the motor as compared with a case where the current position is located indoors.

2. The electric power assist device according to claim 1, wherein the processor switches between a first control that automatically changes the assist amount by the motor and a second control that fixes the assist amount by the motor to a predetermined value.

3. The electric power assist device according to claim 2, wherein the processor switches between the first control and the second control when the user operates a switching unit.

4. The electric power assist device according to claim 3, wherein the processor releases control for reducing the assist amount by the motor in a case where the switching unit is operated to switch from the first control to the second control when the assist amount by the motor is reduced in a state of the first control.

5. The electric power assist device according to claim 3, wherein when the second control is selected by a signal from the switching unit, even though the current position is located outdoors, the processor controls the assist amount by the motor to the same level as the assist amount in a case where the current position is located indoors.

6. The electric power assist device according to claim 1, wherein when determination is made that a predetermined time has elapsed since a start of control for reducing the assist amount by the motor, the processor further reduces the assist amount by the motor.

7. The electric power assist device according to claim 1, wherein:
   the sensor includes a position information detection unit; and
   the processor
     determines, using the position information detection unit, whether the current position is close to a rechargeable point that indicates a recharging location where an external power source is installed, and releases control for reducing the assist amount by the motor when determination is made that the current position is close to the rechargeable point.

8. The electric power assist device according to claim 1, wherein the sensor includes at least one of an air temperature detection unit, an ultraviolet ray detection unit, and a position information detection unit.

9. The electric power assist device according to claim 1, wherein:
the drive member is a wheel; and
the processor controls torque and the number of rotations of the motor when the assist amount by the motor is reduced.

10. The electric power assist device according to claim 9, wherein the processor limits a maximum speed of the motor when the assist amount by the motor is reduced.

11. The electric power assist device according to claim 9, wherein the processor limits maximum torque of the motor when the assist amount by the motor is reduced.

12. The electric power assist device according to claim 9, wherein the processor limits maximum acceleration of the motor when the assist amount by the motor is reduced.

13. A program that causes a processor including hardware to execute: assisting human power input from a user to a drive member with power of a motor; determining whether a current position is located outdoors using a signal from a sensor; and when determination is made that the current position is located outdoors, reducing an assist amount by the motor as compared with a case where the current position is located indoors.

14. The program according to claim 13, wherein the program causes the processor to execute switching between a first control for automatically changing the assist amount by the motor and a second control for fixing the assist amount by the motor to a predetermined value.

15. The program according to claim 14, wherein the program causes the processor to execute switching between the first control and the second control when the user operates a switching unit.

16. The program according to claim 15, wherein the program causes the processor to execute releasing control for reducing the assist amount by the motor in a case where the switching unit is operated to switch from the first control to the second control when the assist amount by the motor is reduced in a state of the first control.

17. The program according to claim 15, wherein the program causes the processor to execute controlling the assist amount by the motor to the same level as the assist amount in a case where the current position is located indoors, even though the current position is located outdoors, when the second control is selected by a signal from the switching unit.

18. The program according to claim 13, wherein the program causes the processor to execute further reducing the assist amount by the motor when determination is made that a predetermined time has elapsed since a start of control for reducing the assist amount by the motor.

19. The program according to claim 13, wherein the program causes the processor to execute: determining, using a position information detection unit included in the sensor, whether the current position is close to a rechargeable point that indicates a recharging location where an external power source is installed; and when determination is made that the current position is close to the rechargeable point, releasing control for reducing the assist amount by the motor.

20. The program according to claim 13, wherein the program causes the processor to execute controlling torque and the number of rotations of the motor when the assist amount by the motor is reduced.

* * * * *